June 2, 1964  V. S. BREIDENBACH ETAL  3,135,575
CAN REJECT RECORDER
Filed June 5, 1962  5 Sheets-Sheet 1
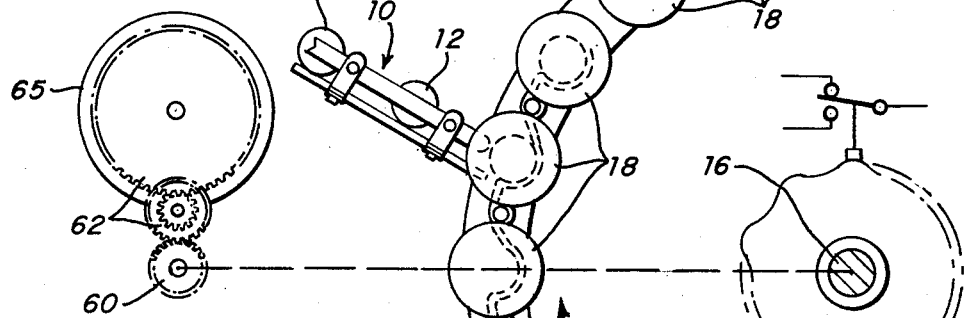
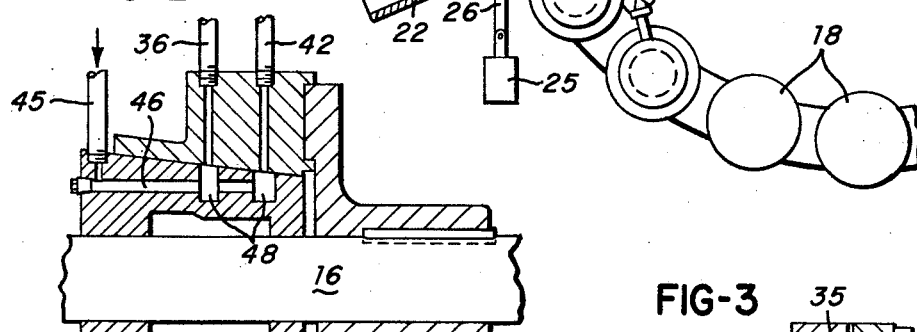
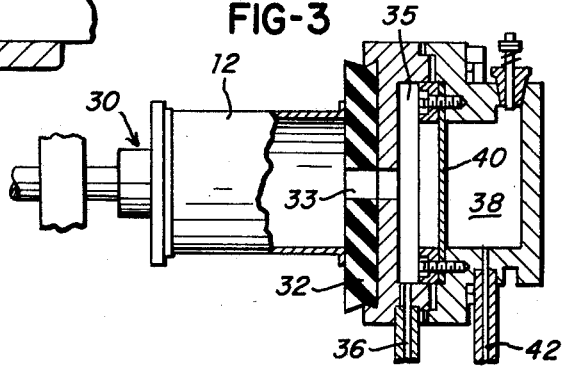
INVENTORS
VICTOR S. BREIDENBACH &
JOHANN E. FRANK
BY
Marechal, Biebel, French & Bugg
ATTORNEYS

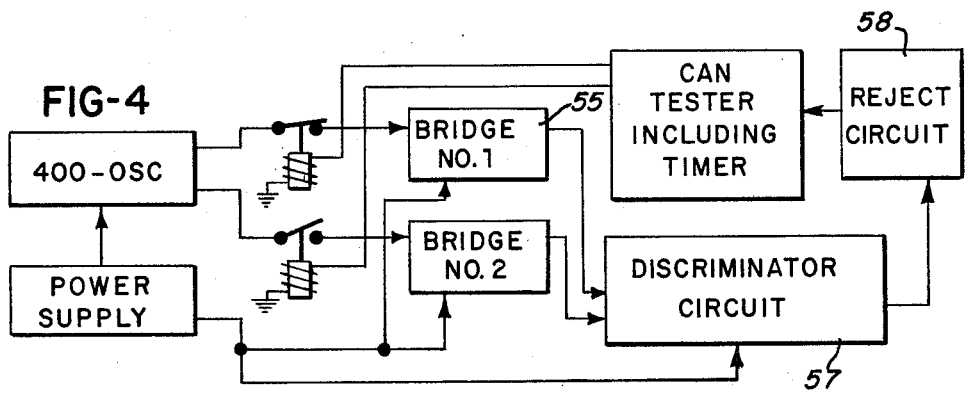
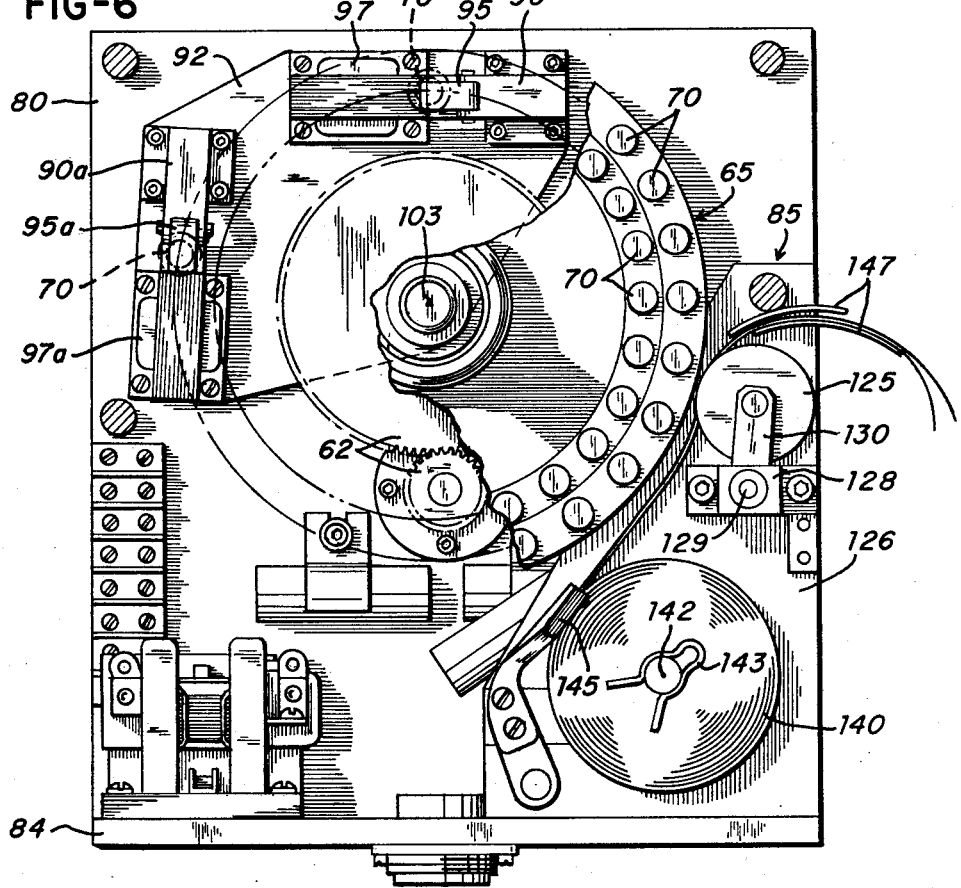

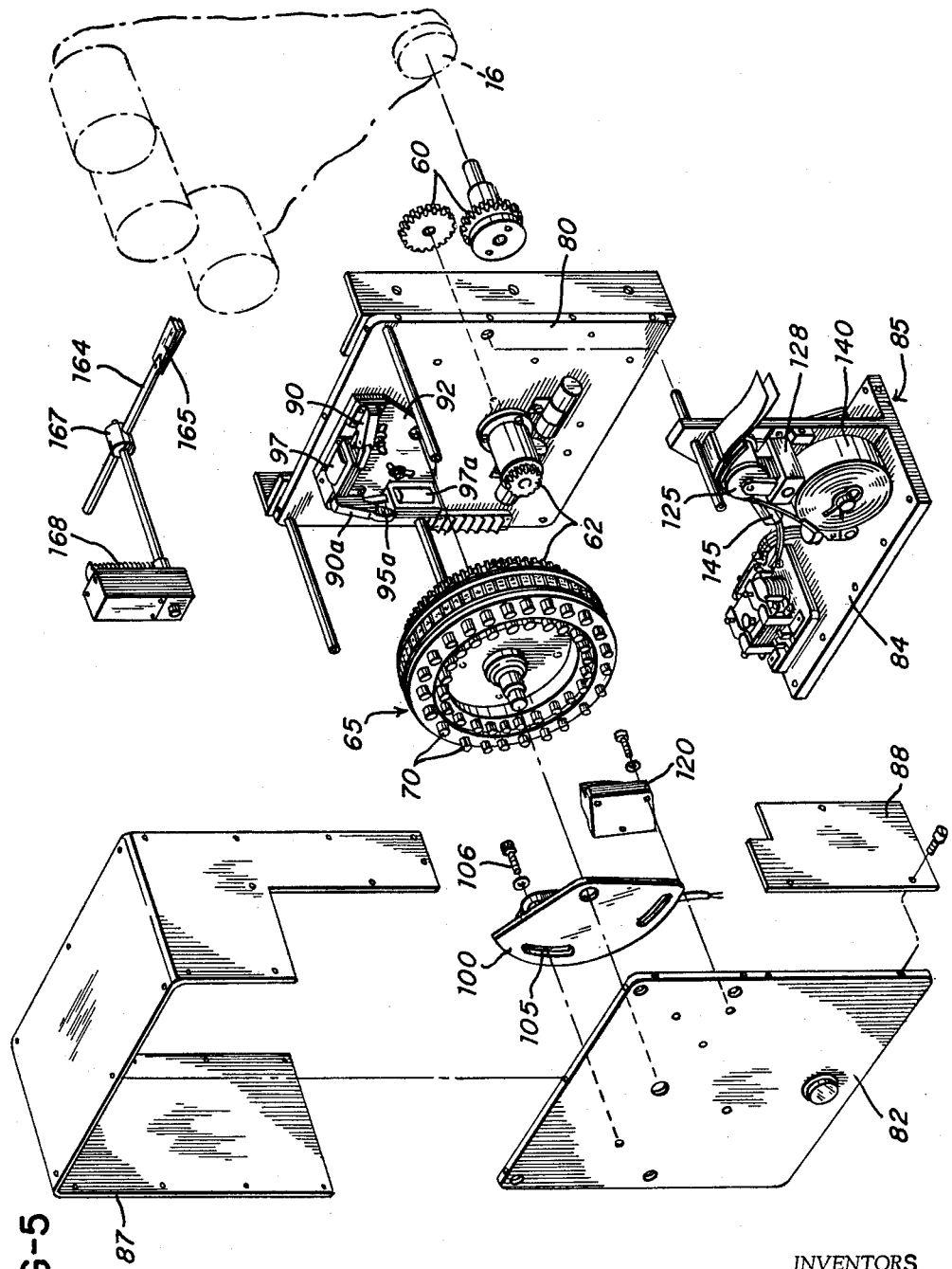

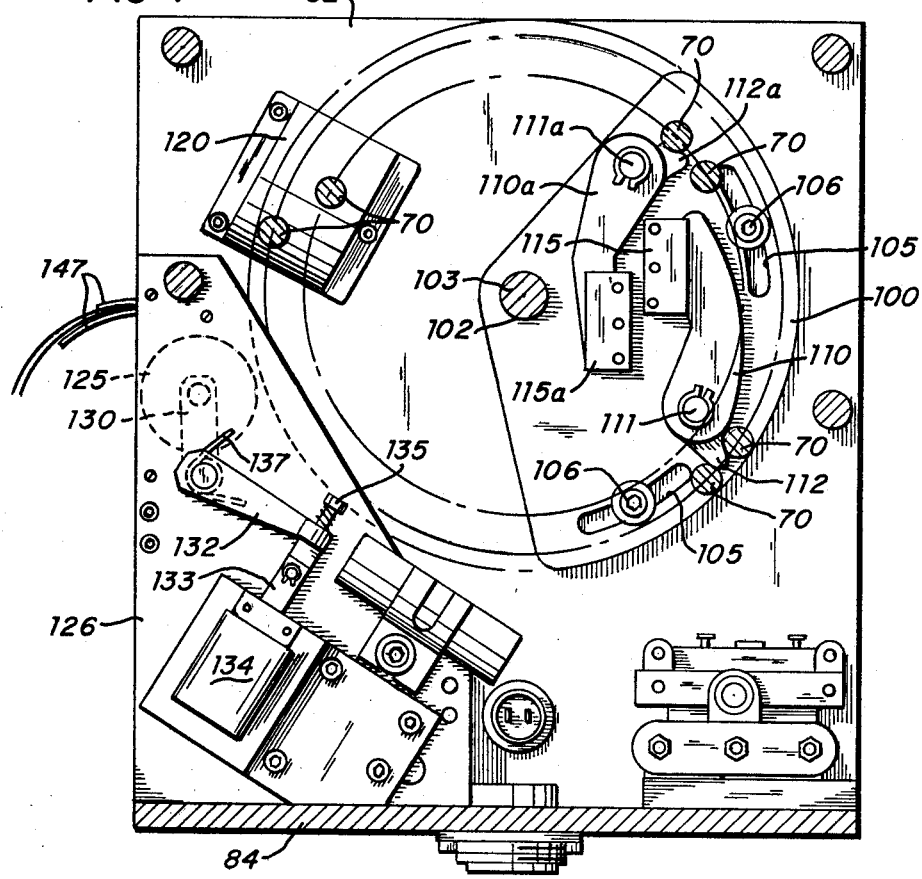
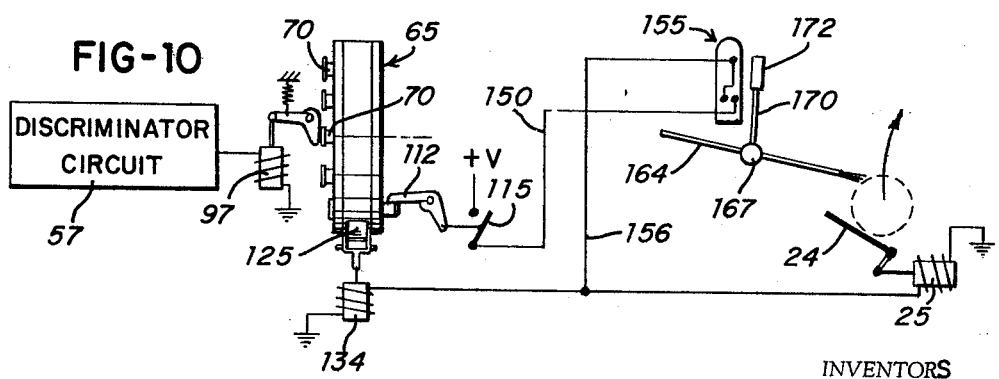

June 2, 1964  V. S. BREIDENBACH ETAL  3,135,575
CAN REJECT RECORDER

Filed June 5, 1962  5 Sheets-Sheet 5

INVENTORS
VICTOR S. BREIDENBACH &
JOHANN E. FRANK
BY
*Marechal, Biebel, Frencky Bugg*
ATTORNEYS

United States Patent Office 3,135,575
Patented June 2, 1964

3,135,575
CAN REJECT RECORDER
Victor S. Breidenbach, Dayton, and Johann E. Frank, Yellow Springs, Ohio, assignors to Westgate Laboratory, Inc., Yellow Springs, Ohio, a corporation of Ohio
Filed June 5, 1962, Ser. No. 200,187
2 Claims. (Cl. 346—35)

This invention relates to apparatus used in the manufacture of cans for packaging of foodstuffs and the like, and particularly to an improvement in machines for testing newly manufactured cans for leaks.

Can testing machines of various types are used to "leak test" newly manufactured cans to determine whether the cans will be suitable for vacuum or pressure packing of foodstuffs, etc. Broadly, these machines all operate on a pressure differential basis, in that each can is subjected to a fluid (usually air) under pressure and a determination is made of the drop in pressure which might be due to leakage of the fluid through small, often invisible imperfections in the can.

One such machine places the open end of the newly manufactured can against a resilient gasket and supplies the interior of the can with air under pressure. The can is held under these conditions for a period of time as it passes through the testing machine and the pressure difference between the pressurized interior of the can and the surrounding atmosphere is monitored. If there is a leak, the interior pressure will drop, and suitable devices on the machine will be actuated to segregate the can from those cans which are acceptable. Another similar machine functions in essentially the same manner, except that it forms a chamber around the can and this chamber is filled with fluid under pressure while the interior of the can is maintained at atmospheric or some other standard pressure.

The cans in any event are placed against a resilient gasket forming a seal against their open ends, and after a time these gaskets will wear, particularly the gaskets often will be nicked or cut by the section of the can rim where the end of the longitudinal seam is located. Very often a tiny and sharp protuberance will form in this section of the rim. Thus, after a time it is possible that the gasket itself at any one or more testing stations on the machine will be the cause of leakage of pressure fluid during the testing operation, and false rejects will result, with acceptable cans being segregated and disposed of. Obviously, this is an undesirable occurrence since it increases the rejection rate unnecessarily and likewise reduces unnecessarily the ultimate output of acceptable cans.

Accordingly, the primary object of the present invention is to provide mechanism which will record some indicia uniquely related to each testing station on a can testing machine, each time that a particular station rejects a can, thereby forming a visual record which can easily be checked to determine whether the same testing station is repeatedly rejecting cans, and guiding the operator to inspect that station for possible malfunction in the mechanism of the testing station itself.

Another object of this invention is to provide a recording device for a can testing machine in which a number is assigned to each testing station on the machine, and which will print a permanent record of such number each time the associated testing station functions to reject a can found to be leaking, such that a visual check can be made to determine whether the same testing station is repeatedly rejecting cans.

A further object of the invention is to provide such a recorder for can testing machines which can also be used to supply the reject signal for causing the actual reject function of the machine when a leaking can is detected.

An additional object of the invention is to provide such a recording device which will function only when a test station has actually rejected a can, and which will ignore a false reject signal from a station where a can was not placed for some reason.

Other objects and advantages of the invention will be apparent from the following description, the accompanying drawing, and the appended claims.

In the drawings:

FIG. 1 is a schematic view of a portion of a typical can testing machine, illustrating also the manner in which the recording device of the present invention is coupled to the testing machine;

FIG. 2 is a somewhat schematic sectional view of a rotary valve which may be used to supply pressure fluid to the various testing stations of the machine;

FIG. 3 is a sectional view, with a can shown partly in section and partly in elevation, of a typical testing station on the machine;

FIG. 4 is a block diagram of a suitable testing circuit used on the machine;

FIG. 5 is an exploded perspective view of the reject recorder of the present invention, including a portion of the can testing machine shown in phantom;

FIG. 6 is a plan view of the recorder, with the front cover removed and a substantial portion of the memory wheel broken away to illustrate the relationship of parts behind such wheel;

FIG. 7 is a view of the reverse side of the front cover of the recorder, as viewed from the rear of FIG. 6;

FIG. 10 is a schematic diagram of the circuit arrangement of the switches utilized in the recorder.

Figure 8:
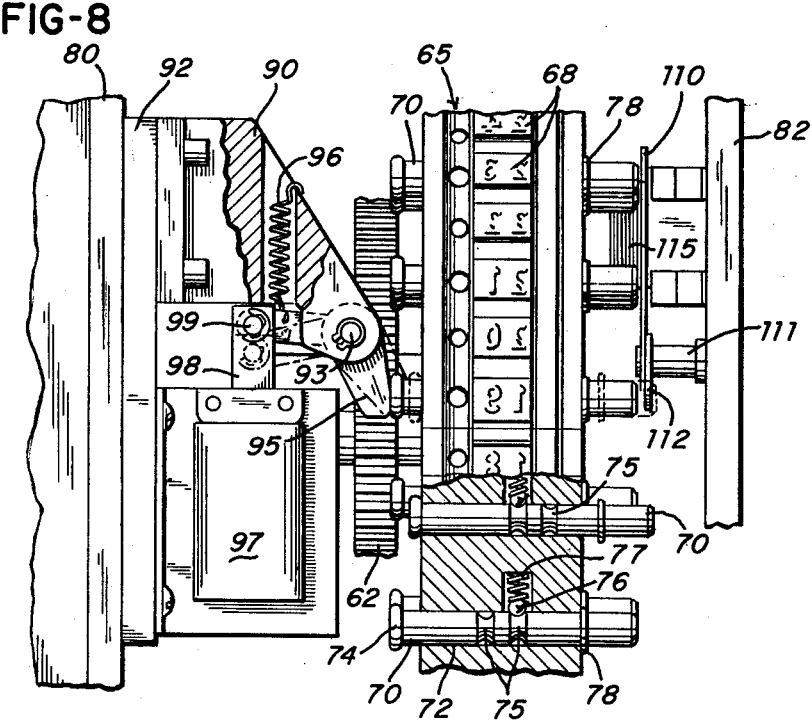
FIG. 8 is a detail view, partly in section and partly in elevation, illustrating the function and construction of the memory pins in the memory wheel of the recorder, together with parts cooperating with such pins.

Referring to the drawings, which illustrate one preferred embodiment of the present invention, a can testing machine is shown generally as including a supply conveyor or guideway 10 along which newly manufactured cans 12 are guided to the testing machine. Only those details of the machine which are necessary to describe the function of the recorder are disclosed herein, it being understood that such machines are well known in the art, being disclosed for example in U.S. Patents 1,845,362 and 1,873,602.

A typical such machine includes a circular frame 15 mounted in suitable manner to rotate with a central drive shaft 16. Carried on the frame 15 are a number of testing stations 18, which move with the frame 15, for example clockwise as indicated by arrow 19 on FIG. 1, past the supply conveyor 10 and past a discharge chute 20 through which acceptable cans pass from the machine. A reject chute 22 is also provided along the path of movement of the test stations, for example immediately preceding the chute 20 in the direction of movement, and this discharge chute may be normally closed off by a pivoted gate 24 which is controlled by a solenoid 25 through suitable linkage 26. When a can at any given station 18 is found to be leaking, a suitable signal is provided which causes solenoid 25 to be energized when that station passes the chute 22, and gate 24 will be opened to permit the can to be released into the reject chute.

Referring to FIG. 3, each testing station includes a plunger 30 operated by suitable mechanism (not shown) to press a can 12 to be tested against a resilient gasket 32. The gasket has a central passageway 33 which communicates through the open end of the can with its interior, and which also extends into a fluid supply cavity 35 to which air or other suitable test fluid under pressure is directed through the tube 36. Behind the cavity or chamber 35 there may be a further chamber 38, separated from chamber 35 by a diaphragm 40, and having an exterior connection tube 42.

In a typical such machine air under pressure is supplied through the main line or tube 45 (FIG. 2) into the supply passage 46 of a rotary valve mounted on the hub of the machine around shaft 16. This passage is adapted to open into valve passages 48 during a predetermined portion of a revolution of the hub, and the resultant connection supplies air under pressure through the tubes 36 and 42 into the cavities 35 and 38. As the hub 50 continues to rotate, the connection with the supply valve passages 48 will be passed and the pressurized cavities at the test station, including a can to be tested, will be cut off from the supply for a predetermined time.

With the pressurized testing station thus isolated the station will be monitored, either immediately or after a predetermined period, and if the pressure in cavity 35 (and hence within the can 12 being tested) has dropped beyond a predetermined amount as compared to the reference cavity (or to atmospheric pressure in other instances), a suitable transducer will function to unbalance a bridge circuit 55 (FIG. 4), causing a signal to pass to a discriminator circuit 57 which in turn activates a reject circuit 58 and eventually causes the can to be rejected. Details of a suitable novel circuitry for this purpose are disclosed in copending application Serial No. 122,784, filed July 10, 1961, and assigned to the assignee of this application.

Driven by shaft 16, through a pair of transfer gears 60 and main pinion and drive gears 62 (FIGS. 1 and 5) is a memory wheel or drum 65. This drum has a plurality of stations about its periphery, corresponding in number to the number of testing stations 18 on the machine, and shown particularly in FIG. 8 as a plurality of relief printing segments 68. Each segment has a different number thereby identifying its corresponding testing station to represent it uniquely with respect to the others. For each station or printing segment 68 there is a corresponding memory pin 70 which is slidably received in a hole or bore 72 through the wheel 65. It will be noted, from FIGS. 5 and 6 in particular, that these pins are arranged in two different rows, in order to accommodate them physically in the drum, but there is one pin 70 for each station or printing segment 68 on the memory wheel. For example, a typical arrangement has the odd number pins in the outer row and the even number pins in the inner row.

Each pin includes a head 74 which limits its movement in one direction through the wheel 65, and the pin is under-cut in two places, as shown generally at 75 (FIG. 8) to form a detent construction which cooperates with a detent ball 76 urged against the pin by a spring 77. A suitable snap ring 78, or the like, limits the movement of pin 70 in the opposite direction in the wheel 65, and functions merely to prevent excessive movement of the pin. In normal operation each pin can attain one of two positions, depending upon which of the grooves 75 is engaged with ball 76, and thus each pin is in effect a mechanical binary indicator which will remain in the position at which it is placed until it is urged to its other position.

The wheel 65 is mounted to rotate between a base or back plate 80 and a front plate 82, both of which are shown in FIG. 5. When the apparatus is assembled the wheel is completely enclosed by means of a bottom plate 84 forming a support for a printing mechanism, shown generally at 85, and a cover plate 87 which is fastened over the sides and top, i.e., the remainder of the space between the front and back plates. A small access plate 88 is provided in one corner of the cover plate 87, to provide for easy access to the printing mechanism 85, particularly for replacement of the record tape therein, as will be explained. The memory wheel 65 rotates in unison with the circular frame 15 of the testing machine. Thus each of the pins 70 passes a fixed position or positions on the front and back plates 80 and 82. The back plate carries apparatus for displacing any one of the pins 70 whenever a can under test is rejected. Since, in order to conserve space, the preferred embodiment includes the two rows of pins, there are two different mechanisms for displacing pins in the two rows. Details of one such mechanism are shown in FIG. 8, and the relative position of the two mechanisms is shown in FIG. 6.

A bracket 90 is mounted on a base plate 92 which in turn is fastened to the back plate 80. This bracket provides a mounting for a stub shaft 93 which in turn mounts a bell crank 95. One arm of this crank, as shown particularly in FIG. 8, intersects the path of movement of one row of pins 70 on the memory wheel. The bell crank is normally held in its raised or inactive position, shown in solid lines, by a retaining spring 96. A solenoid 97 is mounted on the base plate 92 and its armature 98 pivotally connected at 99 to the other arm of the bell crank. Each time the solenoid is energized it will move the bell crank against spring 96 to its extended or actuated position (shown in dot-dash lines), and the pin 70 opposite the head or actuator arm of the bell crank will be thrust inwardly to its indicating position. Referring to FIGS. 5 and 6, it will be noted that there is a companion structure with the same reference numerals having the suffix *a*, i.e., bracket 90*a* and bell crank 95*a* actuated by a solenoid 97*a*. This mechanism is mounted such that the bell crank 95*a* will engage pins in the other row from the crank 95.

Accordingly, when one or the other of the solenoids 97 or 97*a* is energized in response to a reject signal from the appropriate station on the machine, the corresponding memory pin to that station will be aligned with the bell crank, and due to the geared relationship between the memory wheel and the rotating frame of the machine, the appropriate pin will be displaced, and will remain so, providing a mechanical indication of the reject. The actuator mechanism for the printer is shown in FIG. 7, and is mounted on the front plate 82 of the housing, as shown also in FIG. 5. This mechanism includes a sector-shaped base plate 100 which is mounted concentric with the axis of rotation of the memory wheel 65, as by having a hole 102 therein received over the stub end 103 of the memory wheel spindle. A pair of arcuate grooves 105 are provided radially outward from the hole 102 and clamping bolts 106 extend through these grooves for threading into the front plate 82. Thus, the sector plate 100 can be rotated to an exact adjusted position and then clamped securely in place by tightening these bolts.

The actuator mechanism carried by the sector plate 100 includes a pair of bell crank arms 110 and 110*a*, each pivotally mounted on a corresponding pivot pin 111 and 111*a*. The arms have fingers 112 and 112*a* which extend across the path of travel of the outer and inner rows of pins 70, as shown diagramatically in FIG. 7 by the dot-dash circles. If a pin 70 is displaced, indicating a reject, it will be rotated into a position where it will engage one of the fingers 112 or 112*a*, depending upon in which row the displaced pin is located, and this will cause the crank arms 110 or 110*a* to actuate an indicator switch 115 or 115*a*. The resulting sequence will be described hereafter, it being understood, however, that the arrangement of the indicator mechanism can be such that the indication by closing one of the switches 115 or 115*a* can cause actuation of the reject solenoid 25 (FIG. 1) to open the gate 24 to the reject chute 22, if it is desired to use this type of "memory operated" reject control. It should also be noted that the displacement between the operating bell cranks 95 and 95a is the same as the corresponding displacement between the indicating fingers 112 and 112a, so that the resultant reject signal obtained from the memory wheel will occur at the same length of travel of the mechanism after the actual testing station gave indication of a leaking can, whether the corresponding memory pin for such station be located in the inner or outer row of the wheel 65.

Once the displaced memory pin or pins have performed, by tripping the fingers 112 or 112a, they are reset to their normal position by passing over the cam plate or ramp 120. As previously explained, the memory wheel carries a printing segment 68, which may for example be a relief block of a number corresponding to a given testing station to which that segment is related by the fixed interconnection, through the gearing, between the memory wheel into the rotating frame of the machine. Each of the segments, therefore, passes an impression roller 125 which constitutes the moving platen of the printing mechanism 85. This mechanism includes a separate mounting bracket 126 extending from the base plate 84, and on the upper part thereof is a further mounting bracket 128 which includes a pivot pin 129 for a further crank arm 130. This arm provides the mounting for the roller or platen 125, and the other arm 132 (FIG. 7) of this crank extends on the opposite side of bracket 126 and is connected to the armature 133 of a solenoid 134. The connection between arm 132 and the armature may include an adjustable spring loaded bolt 135 permitting an adjustment of the motion imparted from the solenoid to the platen 125. The crank arms 130 and 132 are normally urged into retracted position, as shown in FIGS. 6 and 7, by the hair spring 137, against which the solenoid operates.

A supply roll of recording tape 140, or equivalent material is shown in FIGS. 5 and 6. This roll is mounted on a shaft 142 extending from bracket 126, and is held in place by removable spring pin 143 which provides for easy replenishment of the tape 140. One suitable form of tape includes a paper strip having a carbon paper overlay or laminate, which may be merely rolled between the paper or may actually be fastened thereto. This double strip is guided from the roll 140 by pivoted guide arm 145, and the strip extends from such arm over the platen 125 and exits between the curved guide plates 147. The tape 140 is advanced forward toward the guide plates 147 as a result of the pressed engagement of the tape with the rotating memory wheel by the platen 125.

Of course, whenever for some reason the testing machine fails to have a can at any station, this will inherently result in a reject signal which has no effect upon the operation of the machine, since there is nothing at the station actually to be rejected. However, it is not desirable to have the recorder produce a record of such a false reject, and accordingly provisions are made to avoid a record of any reject due to absence of a can at a test station. The basic circuit arrangement for this purpose is shown in FIG. 10, it being understood that the circuit illustrated is merely schematic, to demonstrate the principle of operation, and does not incorporate all of the switches in the actual circuit.

Basically, the reject signal originates in the discriminator circuit 57 and causes solenoid 97 to be energized resulting in displacement of the appropriate memory pin 70. When this pin is carried around to the indicator finger 112, movement of this finger closes switch 115, and this applies a voltage to the control line 150. This line is connected through an indicator switch 155 which, when closed, will apply a potential to line 156, causing energization of the print solenoid 134 which in turn drives the platen 125 against the appropriate printing segment 68 on the memory wheel. At the same time, if desired the line 156 can be connected to energize the reject solenoid 25 of the machine, opening the reject gate 24 and causing the rejected can to fall into chute 22.

Figure 9:
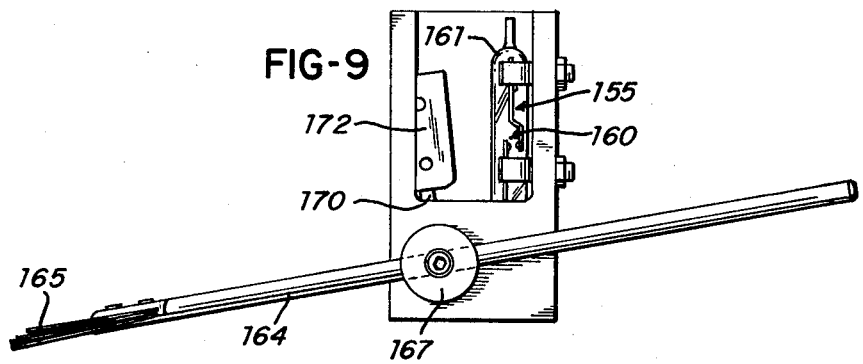
FIG. 9 is a detail view of a station detector mechanism for determining whether a can is actually in place at a test station.

The indicator switch 155 is a normally open magnetically operated switch, preferably of the type shown in FIGS. 9 and 10. It includes normally open contacts 160 encased within a cover or housing 161. An arm 164 having one or more feeler strips 165 at an end thereof is mounted in a pivoting hub 167 which is arranged on the machine such that the feelers will engage a can if it is present at the testing station when such station is at the reject position. The general arrangement of the indicator switch feeler is shown in FIG. 5, wherein it will be noted that a spring 168 is provided to urge arm 164 and the feeler thereon into a position where the feeler will be contacted by any can in a testing station passing the reject position.

The hub 167 has a control arm 170 fastened thereto and carrying a permanent magnet 172. Whenever a can is present in a station the hub will be rotated causing the magnet 172 to move toward switch 155, whereby the magnetic field will cause the switch contacts 160 to close, completing the circuit from line 150 to 156.

The above described indicator mechanism is, of course, but one convenient apparatus for accomplishing the the desired purpose. Other suitable indicators have been utilized, for example, a non-contacting electronic proximity device can be located adjacent to the path of movement of the stations 18, and operating on the basis of a change in capacitance (or electromagnetic effects) can generate a signal indicating presence and/or absence of a can in a station.

While the form of apparatus herein described constitutes a preferred embodiment of the invention, it is to be understood that the invention is not limited to these precise forms of apparatus, and that changes may be made therein without departing from the scope of the invention which is defined in the appended claims.

What is claimed is:

1. A recording device for producing a visual record of the particular testing station on a can leak testing mechanism from which a can has been rejected for failure to retain test fluid under pressure, comprising control means operative by each of the testing stations on the machine in response to rejection of a can at a corresponding station, a wheel rotating in fixed relation with the sequence of use of the testing stations and having a plurality of printing segments with unique identifying characteristics corresponding to the individual testing stations, a platen movable toward said segments on said wheel under the control of said control means and in response to rejection of a can by a testing station whereby a print can be made identifying the station at which the rejection occurred, and indicator printing paper passing between said platen and said printing segments to produce a print thereon upon movement of said platen and simultaneously to advance the paper by rotation of said wheel to feed the paper past said platen in readiness for a subsequent printing operation.

2. A recording device for producing a visual record of the particular testing station on a can leak testing machine from which a can has been rejected for failure to retain test fluid under pressure, comprising a memory device having temporary indicators at a plurality of stations corresponding in number to the testing stations on said machine, control means operative between each of the testing stations on the machine and corresponding stations on the memory device to activate a temporary indicator in the memory each time the corresponding test station rejects a can, said memory device including a wheel rotating in fixed relation with the sequence of use of the testing stations, a plurality of printing segments on said wheel each having independently different numerals thereon identifying a corresponding testing station on the machine, and printing means controlled by the memory device including said printing segments and a platen movable toward said segments on said memory wheel in response to a signal generated by an activated indicator in said memory wheel, and indicator printing paper threaded between said platen and said printing segments to produce a numeral print thereon upon movement of said platen and simultaneously adapted to advance in response to rotation of the memory wheel to carry the paper forward in readiness for a subsequent printing operation.

References Cited in the file of this patent

UNITED STATES PATENTS

| | | |
|---|---|---|
| 1,845,362 | Tevander | Feb. 16, 1932 |
| 2,543,790 | Maher et al. | Mar. 6, 1951 |
| 2,791,482 | Traugott | May 7, 1957 |
| 2,962,655 | Wiley et al. | Nov. 29, 1960 |
| 2,985,008 | Renard | May 23, 1961 |